United States Patent

[11] 3,590,630

| [72] | Inventor | Alf A. Ericksson<br>Nacka, Sweden |
| --- | --- | --- |
| [21] | Appl. No. | 750,639 |
| [22] | Filed | Aug. 6, 1968 |
| [45] | Patented | July 6, 1971 |
| [73] | Assignee | Aktiebolaget Svenska Precisionsverktyg<br>Nacka, Sweden |
| [32] | Priority | Aug. 11, 1967 |
| [33] | | Sweden |
| [31] | | 11,395/1967 |

[54] HARDNESS TESTER
5 Claims, 4 Drawing Figs.

[52] U.S. Cl. .................................................. 73/83, 308/6 R
[51] Int. Cl. ............................................................ G01n 3/44
[50] Field of Search ................................................ 73/78, 81, 83—85; 308/4—6

[56] References Cited
UNITED STATES PATENTS

| 2,025,721 | 12/1935 | Broulhiet | 308/6 X |
| --- | --- | --- | --- |
| 2,231,895 | 2/1941 | Foster | 308/6 X |
| 2,418,916 | 4/1947 | Weaver | 73/81 |
| 2,554,206 | 5/1951 | Pearson | 73/83 |
| 2,726,540 | 12/1955 | Small | 73/83 |
| 3,416,367 | 12/1968 | Ernst | 73/83 |

FOREIGN PATENTS

| 927,141 | 5/1963 | Great Britain | 73/83 |
| --- | --- | --- | --- |

Primary Examiner—Richard C. Queisser
Assistant Examiner—C. E. Snee, III
Attorney—B. Edward Shlesinger ABSTRACT: A test specimen support is adjustable vertically to urge a specimen against the lower end of a vertically movable spindle, the upper end of which engages a loading beam at a point that is offset from the horizontal axis of the beam. The heavier end of the beam rests on the upper end of the spindle to preload the specimen as the support rises, and the opposite end of the beam is attached to an indicator which zeros when the beam has pivoted upwardly far enough to complete the preloading. At this time a first signal is produced to indicate that the main load, which overlies the heavier end of the beam, may be released. If the support is elevated too far, so that the beam is pivoted into contact with the main load during preloading, a second signal occurs, and the main load is prevented from being released.

FIG. 1
FIG. 2
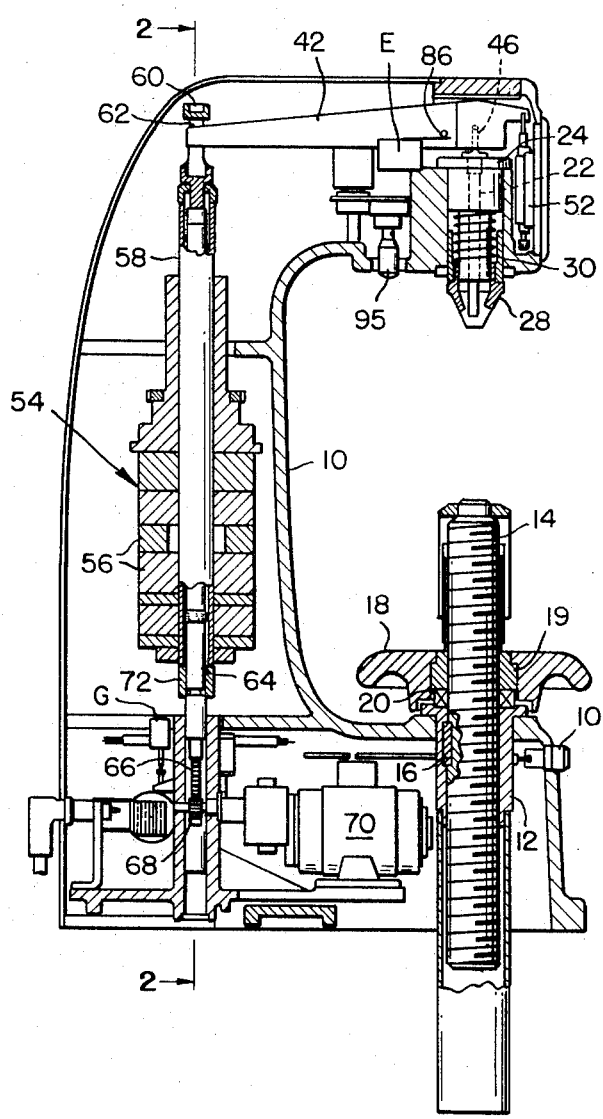
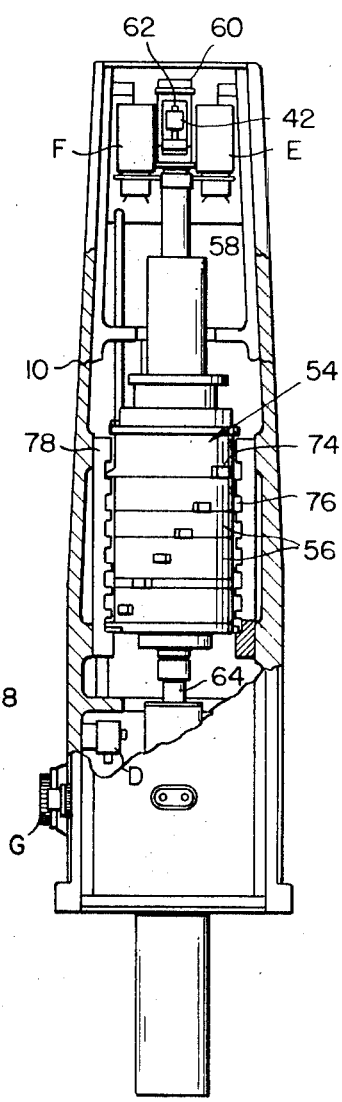
INVENTOR.
ALF A. A. ERIKSSON

HARDNESS TESTER

This invention relates to a hardness tester.

More particularly this invention relates to a hardness tester of the kind comprising a component, such as a screw, which is vertically displaceable in a standard and intended to carry a test piece and which through said test piece actuates a pressure or thrust spindle which on upward displacement bears with a measuring tip or indentor against the test piece and simultaneously is subjected to a preload from a balance beam which thereupon is loaded with an axially displaceable weight member, the "main load," for carrying out a hardness test. The weight member is released and can be returned to the starting position by means of a suitably reversible motor, for example.

Hardness testers of this kind are usually operative according to the Rockwell method as is described in the U.S. Pat. Nos. 1,516,207 and 1,516,208, for example, which mode of operation generally consists therein that an indentation by the indentor of the thrust spindle into the test piece is first brought about by the minor preload in order to eliminate sources of faults which can result from the fact that the test surface is not even or homogeneous in its structure. Thereupon a deeper indentation in the test piece is made by means of the major or main load and the final value is determined by the difference in indentation depths brought about by the main load and the preload, respectively. To ensure that the method renders reliable results the preload must keep correct value within narrow limits.

The screw, together with the test piece, are elevated manually while the preload is being imposed, and simultaneously the distance covered by the pressure or thrust spindle is read by means of a pointer or similar indicator. During this operation there is the danger that test piece is elevated too far so that the balance arm is swung to establish contact with the main load. Thereby the correct value of the preload is disturbed and the measuring test gives a faulty result.

One main object of the invention is to eliminate this drawback so that the danger of wrongly performed tests is considerably reduced or totally eliminated. According to one main feature of the invention the thrust spindle is devised to actuate two signal members of which one member when the preload has reached correct value indicates that a test cycle can be initiated while the other signal member, in case that the balance beam has been turned so much by the vertically displaceable component that the main load already has begun or is about to act on the spindle, indicates that the test cycle is not to be carried out.

Another object of the invention is to provide a hardness tester which can be used for both manual and automatic start of the test cycle. The automatic start of the test cycle is of course time saving, but the manual start is often preferred when one is compelled to adjust the test piece to an exact position, for example when testing long shafts or cylindrical or spherical pieces in general or details presenting a small test surface.

Still another object of the invention is in a hardness tester of the kind under consideration to provide an exact guiding of the thrust spindle with a minimum of friction and without any danger of non controllable resistance to movement which could have a disturbing influence on the test results.

Further objects and advantages of the invention will become apparent from the following description, considered in connection with the accompanying drawings which form part of this specification and of which:

FIGS. 1 and 2 are partially sectional views of a hardness tester embodying the features of the invention and exposed in planes extending at a right angle in relation to one another.

Figure 3:
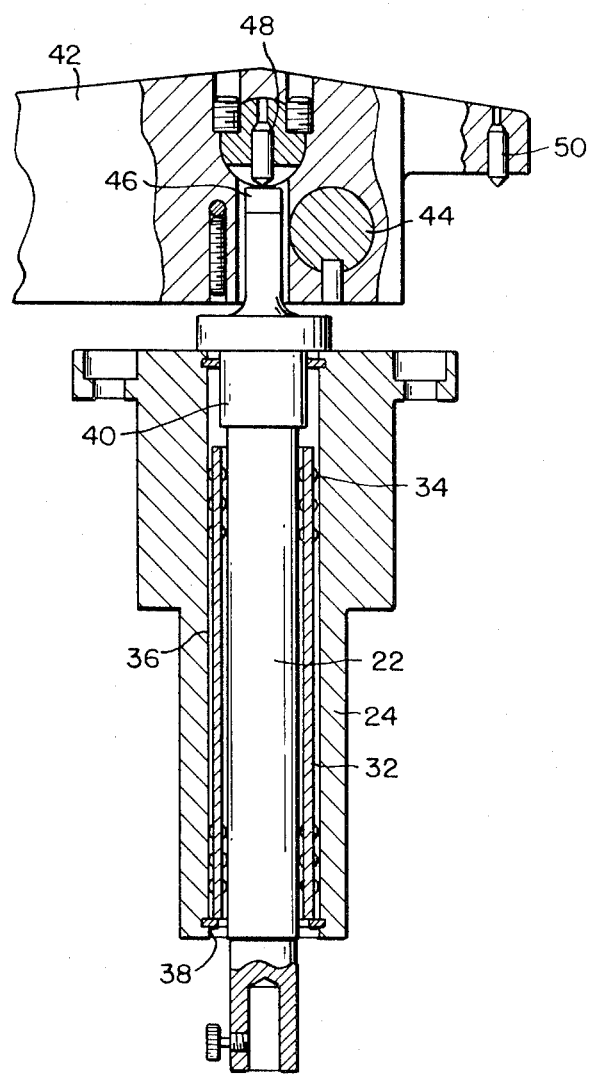
FIG. 3 is a partially sectional view in a larger scale of a thrust spindle and members cooperating with the same.

Referring now to FIGS. 1 and 2, reference numeral 10 generally denotes a standard into which a sleeve 12 is inserted in fixed relationship, a screw 14 being mounted to be axially displaceable but nonrotatable within said sleeve. To this end a wedge member or key 16 is inserted between the sleeve 12 and the screw 14, said wedge member 16 permitting the axial movement of the screw by cooperation with an axial groove formed in said screw. A handwheel 18 is through a bushing 19 threaded on the screw 14. An axial thrust bearing 20 is interposed between said bushing and the stationary sleeve 12. By turning the handwheel 18 the screw 14 is displaced upwardly and downwardly without being rotated.

The standard 10 has a curved body and carries in its upper portion a thrust spindle 22 which is coaxial with the screw 14 and axially displaceable within a stationary sleeve 24. At its lower end the thrust spindle 22 carries a measuring point or indentor 26 which is surrounded by a cap 28 which in a turn is movable in vertical direction against the pressure of a spring member 30. When the screw 14 with the test or work piece resting thereon is moved upwardly said test piece is engaged by the cap 28 before it makes contact with the indentor 26.

It is of essential importance that the displacements in a vertical direction of the thrust spindle 22 encounter a minimum of friction while at the same time being free from any lateral play. This is brought about by a bearing assembly which includes a retainer or cage 32 (FIG. 3) of great axial dimension for balls 34. The balls 34 bear against the cylindrical outer surface of the thrust spindle and the inner cylindrical surface 36 of the sleeve 24. They are disposed in a great number of rows the one above the other about the circumference of the thrust spindle 22. Their diameter is slightly larger than the interspace between the surface 36 and the thrust spindle 22 so that a "negative play" is brought about and ensures a correct position of the thrust spindle relative to its longitudinal axis.

In spite of this negative play the retainer 32 may change its axial position relative the thrust spindle 22. In order to avoid noncontrollable loads on the thrust spindle the sleeve 24 is at its lower end provided with a stopper ring 38 which limits the downward movement of the retainer. Adjacent its upper end the thrust spindle 22 is provided with a stop shoulder 40 which limits the free movement of the retainer upwardly relative to the thrust spindle. This disposition of the stops for the retainer 32 makes sure that the thrust spindle 22 under no circumstances can be subjected to an additional axial load as the result of the retainer 32 being in an end position when a test cycle is to be performed and thus a sliding movement in stead of a rolling movement between the balls 34 and their roller ways would be produced. Such additional load on the thrust spindle could occur if the lower stop were to be provided on the thrust spindle and the upper stop on the stationary sleeve 24.

When the ball retainer 32 is moving towards one of the stops such as the lower stop 38, the sliding friction between the thrust spindle 22 and the balls 34 which is produced by the negative play must not reach a higher value than can be overcome by the preload, so that the thrust spindle after each completed test cycle is surely returned to its normal starting position.

In the upper portion of the standard 10 a balance beam or lever arm 42 is mounted to swing about a pivot 44. The thrust spindle 22 has an upper, reduced-diameter prolongation 46 which bears against the lower end point of a pin 48 rigidly secured on the balance beam 42. This latter extends to the left in FIGS. 1 and 3 from pivot 44 over the prolongation 46 of the spindle to the middle of the upright portion of the standard, where a weight member is provided. The balance beam has in its shorter arm a pin 50 which cooperates with a pointer of a measuring scale 52 rendering possible a reading from outside of the tester. Due to the feature that the balance beam 42 has a suitably larger and heavier lever arm on one side of the pivot 44 than on the other side it will, when the thrust spindle 22 is displaced upwardly, act on said spindle with a predetermined load, the "preload," which can be of the magnitude of 10 kilograms.

The main load is constituted by the weight member generally denoted 54 and composed of a plurality of weight units 56 which are supported by a sleeve 58 having an upper yoke 60 which has an edge 62 that cooperates with the balance beam 42. Disposed within the sleeve 58 is a rod 64 which has a portion 66 formed as a vertical rack, which is engaged by a toothed wheel 68 driven by a motor 70. The rod 64 has a fixed stop 72 which normally defines the height position of the weight member 54 in relation to the beam 42. When the motor 70 is caused to rotate in one direction, the rod 64 moves downwards, the weight member 54 then resting on the balance beam 42 via the edge 62 thereby imposing the main load on the beam. By reversing the motor the weight member 54 is moved upwards to its starting position. The number of weight units 56 active in constituting the main load can be changed in known manner by utilizing projections 74 formed thereon to enter recesses 76 in two vertical bars 78. When the projections 74 of a weight unit 56 have been introduced into their recess 76 said weight unit together with those superposed thereon are disengaged from the active main load.

Figure 4:
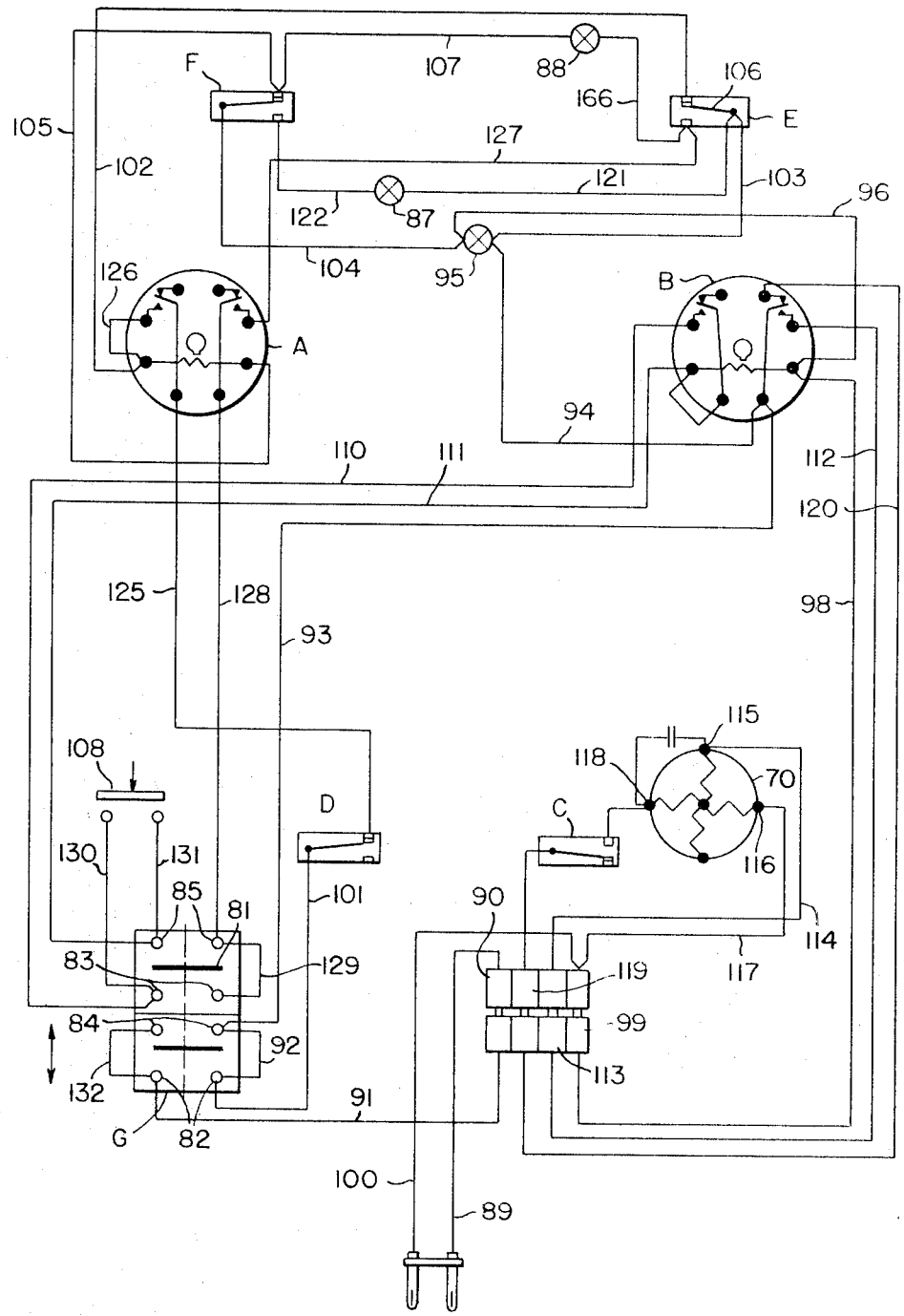
FIG. 4 illustrates a wiring diagram showing one manner in which the tester may be wired for operation.

The electric equipment of the apparatus which is best understood from the wiring diagram presented in FIG. 4 comprises in addition to the motor 70 two relays or circuit breakers A, B and four microswitches C, D, E, F. The equipment further includes a switch G which can be adjusted from outside of the apparatus to manual or automatic testing. In manual testing the two current bridges 80, 81 of the switch G are brought in contact with the lower pair of poles 82 and 83 and in automatic testing in contact with the upper pair of poles 84, 85. The microswitch C and microswitch D actuate the motor 70 and therethrough the vertical movement of the rod 64 in a manner to be described below in a more detailed manner. The microswitch E is located on the balance beam 42, as will be seen from FIGS. 1 and 2 and collaborates with a pin 86 provided on said beam in such a manner as to change over as soon as the thrust spindle 22 and thereby the test piece have been loaded with the preload from the balance beam 42. Hereby a green lamp 88 (FIG. 4) is caused to glow. The microswitch F is located on the balance beam 42 on the side opposite to that on which the microswitch E is positioned and is actuated by a similar pin provided on the balance beam, when said beam due to an unintentionally too great turning movement of the wheel 18 has reached too high a position and thus danger exists that the thrust spindle also has begun to be subjected to the main load. Hereby a red lamp 87 is caused to glow.

Assuming now that the switch G is set for manual testing, which means that it has been turned so that the contact bridges 80, 81 are in contact with the contacts 82, 83, a circuit is now formed from wire 89 connected to the main power supply, a pair of contacts 90, wire 91, the contact bridge 80, wires 92, 93, 94 to a lighting lamp 95 (see also FIG. 1), wires 96, 98, the pair of contacts 99 to wire 100 which is connected to the opposite side of the power supply. Thereby the lamp 95 is made to glow. At the same time the relay A is supplied with current through a branch connected to said circuit, said branch being represented by wire 103, the microswitch E, wire 102, the armature coil of the relay, wire 105, the microswitch F and wire 104. The relay A is thus energized and the wire 102 is connected through wire 126, the relay A, wire 125, the microswitch D and wire 101 to the current-carrying part of the switch G. The relay A also interconnects wires 127, 128, 129.

The apparatus is thus ready to begin a test cycle. A test or workpiece is mounted on the upper end of the screw 14 which is advanced upwards by means of the wheel 18, until the workpiece meets the indentor 26 of the thrust spindle 22. Under the continued upward movement the workpiece is subjected to the impact of the preload from the balance beam 42, the left-hand part of which according to FIG. 1 is thereby swung upwardly about the pivot 44. The pointer or indicator of the measure scale 52 is then adjusted so that it approaches a zero position as soon as the preload has been imposed and an initial indentation corresponding thereto has been effected in the workpiece by means of the indentor 26. When the zero position is reached and being passed, the microswitch E is met by the pin 86 on the balance beam 42 so that the contact arm or tongue 106 of said switch is changed over and an electric connection is established between the current-carrying wire 103, the contact arm 106, wire 166, the green lamp 88, wire 107, the microswitch F and the current-conducting wire 104. The lamp 88 is brought to glow and indicates that correct preload has been reached.

Thereupon a pushbutton 108 on the front side of the apparatus, see FIG. 1, is depressed, thereby causing the relay B to be energized by current now being supplied through the current-conducting wire 130, the pushbutton 108, wires 131, 111 to the armature coil of the relay B and further to the wire 98. The relay B now establishes firstly a current connection via the wire 110 to the armature coil of the relay B, which is maintained after that the pushbutton 108 has returned to neutral position, and secondly a connection between the wires 92, 93, 112, the pair of contacts 113, the wire 114 and the one pole 115 of the motor 70. The other pole 116 of said motor has already earlier become current conducting through wires 117 and 100. The motor is now started, thereby causing the rod 64 to be moved downwards and the weight member 54 is lowered into contact with the balance beam 42 whereby the main load is brought to act on the indentor 26 of the thrust spindle. The movement of the balance beam 42 coinciding herewith is transferred to the pointer of the measuring scale 52 and produces a deflection of the pointer corresponding to the hardness of the test or workpiece, expressed in suitable measuring units.

Immediately after the start of the motor the microswitch C is caused by the motor 70 or the rod 64 to change over to be clear for the reversing of the motor. By this changeover a current connection has been established from the pole 118 of the motor 70, via the pair of contacts 119 and the wire 120 to the relay B. Thus, the rod 64 has proceeded downwardly a predetermined distance depending on the time to which a known and not shown timer has been adjusted, the rod actuating the microswitch D in such a manner that said switch opens. Thereby the relay A is deenergized and also the relay B, so that now a circuit to the pole 118 of the motor is established through the relay B, the wires 93, 92, the bridge 80, the wire 91, the pair of contacts 90 and the wire 89 to the power supply. The motor 70 reverses and when the rod 64 under the upward movement has reached its starting position, at which time the microswitch C is again opened and the motor 70 stops. During the upward advance of the rod also the microswitch D is caused to return to its closed position. The hardness value can be read from the measuring scale 52. By lowering the screw for release and removal of the test piece the microswitch E is changed over to the position illustrated in FIG. 4, whereupon the relay A is again energized and a new test cycle can be initiated.

If upon ignition of the green lamp the handwheel 18, during the initial phase of the test cycle, by error continues to be turned, the long lever arm of the balance beam 42 is pivoted further in an upward direction and causes the arm of the microswitch F to establish contact with the associated pin on the balance beam 42, which causes the red lamp 87 to glow. The current will then flow through a circuit which comprises the wires 103, 121, the lamp 87, the wire 122, the microswitch F and the wire 104. Simultaneously the relay A is deenergized and the green lamp 88 darkens. Thereupon no test can be carried out, since the motor 70 does not start when the pushbutton 108 is pressed in.

For automatic testing the switch G is readjusted so that its current bridges 80, 81 instead are in contact with the contacts 84, 85. In this case also the preload is applied by moving the test or work piece resting on the screw 14 by means of the wheel 18 against the indentor 26 of the thrust spindle. As soon as the green lamp 88 is ignited, the relay B is also energized and the motor 70 starts automatically. The current circuit to the armature coil of the relay B is closed through the wires 91, 132, the bridge 80, the wires 93, 94, 103, the microswitch E, the wire 127, the relay A, the wire 128, the bridge 81, the wire 111 and through the armature coil, the wire 98, the pair of contacts 99 and the wire 100. The poles 115, 116 of the motor thus are supplied with current through a current circuit constituted by the wire 93, the relay B, the wire 112, the pair of contacts 113, the wire 114 and the wires 117, 100. Also now the microswitch C is caused to close and the cycle is repeated with regard to the lowering of the rod 64 by the motor until said rod has actuated the microswitch D and the motor is caused to reverse. After the main load has been applied onto the balance beam 42 the motor thus returns the rod 64 and the weight member to their starting positions.

If in this case the handwheel 18 should be turned too far, the red lamp 87 is caused to glow in the same manner as described above. The motor has started before this moment, but as the balance beam 42 now has actuated the microswitch F, the relay A becomes deenergized and therewith also the relay B so that the motor is reversed by the current now supplied through the microswitch C. As already mentioned, said microswitch had been closed at the same moment when the motor started. Therefore, the motor returns the rod 64 and therewith also the main load to the starting position before a new test cycle can be carried through. By providing a time delay in the relay B the start of the motor can be postponed for a suitable interval.

The motor 70 may also be of a hydraulic or pneumatic type. The weight member 54 can be adapted to be actuated manually for its return to the upper end position.

The contact points between the arms or tongues of the microswitches E, F (compare 106 in FIG. 4) and the balance beam 42 must for several reasons be located nearly adjacent to the pivotal axis 44 of the balance beam. This imposes great demands on the adjustment of the microswitches E, F to assure their correct changingover positions. Such adjustment is usually effected by means of a screw provided on the microswitches, the total adjustment range then comprising a turn of some few degrees only of the screw which therefore makes it very difficult to find out the correct position. To make this adjustment easier the fastening means for the microswitch on the stationary standard, such as a bracket, is according to a particularly advantageous embodiment of the invention made adjustable by utilization of an elastic deformation of said means, for example. To this end the means can in known manner be formed with a slot which permits adjustment of the microswitch by means of a screw. By this expedient the screw is given an adjustment range comprising a turn of the magnitude of 90° which renders the adjustment of the microswitch much easier and less sensitive than in the embodiment described hereinbefore.

While several more or less specific embodiments of the invention have been described and shown, it is to be understood that this is for purpose of illustration only, and that the invention is not to be limited thereby, but its scope is to be determined by the appended claims.

What I claim is:

1. A hardness tester comprising
a stand having upper and lower jaw members,
a test specimen support mounted on said lower jaw for vertical movement,
a test spindle mounted in said upper jaw in alignment with said support,
a loading beam mounted on said stand above said spindle to pivot about a horizontal axis,
main loading means mounted on said stand above one end of said beam, and normally disconnected from said one end of said beam but connectable thereto,
a separate pivot point on said beam at one side of said axis between said axis and said one end of said beam for engaging the upper end of said spindle to pivot said beam on said spindle, said pivot point being much closer to the horizontal axis of said beam than to said one end, whereby the weight of the beam portion between said one end and said pivot point is greater than the weight of the beam portion between said pivot point and said horizontal axis,
means for adjusting said support upwardly to move a test specimen against the lower end of said spindle to urge said spindle and said one end of said beam upwardly, whereby said beam preloads said test specimen by resisting the upward movement of said spindle, and
spaced signal generating means mounted on said stand and operative, when said one end of said beam has been pivoted upwardly a first predetermined distance toward said main loading means, to produce a first signal, and operative to produce a second signal, when said one end has pivoted upwardly a predetermined distance beyond said first distance to indicate that the test should be discontinued, and
means operable after the production of said first signal to connect said main loading means to said beam, and
means operative after the production of said second signal automatically to prevent operation of said connecting means.

2. A hardness tester comprising
a stand having upper and lower jaw members,
a test specimen support mounted on said lower jaw for vertical movement,
a test spindle mounted in said upper jaw in alignment with said support,
a loading beam mounted on said stand above said spindle to pivot about a horizontal axis,
main loading means mounted on said stand above one end of said beam, and normally disconnected from said one end of said beam but connectable thereto,
a separate pivot point on said beam at one side of said axis between said axis and said one end of said beam for engaging the upper end of said spindle to pivot said beam on said spindle, said pivot point being much closer to the horizontal axis of said beam than to said one end, whereby the weight of the beam portion between said one end and said pivot point is greater than the weight of the beam portion between said pivot point and said horizontal axis,
means for adjusting said support upwardly to move a test specimen against the lower end of said spindle to urge said spindle and said one end of said beam upwardly, whereby said beam preloads said test specimen by resisting the upward movement of said spindle, and
spaced signal generating means mounted on said stand and operative, when said one end of said beam has been pivoted upwardly a first predetermined distance toward said main loading means, to produce a first signal, and operative to produce a second signal, when said one end has pivoted upwardly a predetermined distance beyond said first distance to indicate that the test should be discontinued,
hardness indicator means connected to said beam and movable thereby to a zero position, when said one end of said beam has been pivoted upwardly at least said first predetermined distance,
said one end of said beam being engageable with said main loading means when said one end has been pivoted upwardly said predetermined distance beyond said first distance, whereby said second signal is operative to indicate excess upward pivotal movement of said one end of said beam.
said signal generating means comprising
a pair of switches mounted on said stand, and
a pair of spaced actuators on said beam for pivotal movement therewith,
one of said actuators being operative to actuate one of said switches, when said one end of said beam has been pivoted upwardly said first distance, and the other of said actuators being operative to actuate the other of said switches when said one end of said beam has engaged said main loading means.

3. A hardness tester as defined in claim 2, including electrically operated means connected in circuit with said switches and operable when said one switch only is actuated to connect said main load means to said beam, and operative when both said switches are actuated to prevent operation of said connecting means.

4. A hardness tester as defined in claim 3, wherein said main loading means comprises a weighted member, said connecting means comprises a reversible electric motor connected to said weighted member normally to hold said weighted member in spaced relation to said beam, and said switches are connected in circuit with said motor, and having cycling means operable, when said one switch only is actuated momentarily to energize said motor thereby temporarily to connect said weighted member to said one end of said beam to test the hardness of said specimen.

5. A hardness tester as defined in claim 4, including a third switch movable manually to first and second positions, selectively, means operative, when said third switch is in said first position, to prevent energization of said motor, when said other switch is actuated, and means operative, when said third switch is in said second position, automatically to actuate said cycling means when said one switch is actuated, and to interrupt said cycling means, when said other switch is actuated.